United States Patent Office 2,762,747
Patented Sept. 11, 1956

2,762,747

PREPARATION OF 17-KETO STEROID BY PENICILLIUM

Herbert C. Murray, Hickory Corners, and Durey H. Peterson, Kalamazoo Township, Kalamazoo County, Mich., assignors to The Upjohn Company, Kalamazoo, Mich., a corporation of Michigan No Drawing. Application October 1, 1953,
Serial No. 383,702

20 Claims. (Cl. 195—51)

The present invention relates to a novel process for the fermentative degradation of the 17-side chain of 20-ketopregnanes and 20-ketoallopregnanes to yield 17-ketosteroids, especially 17-ketoandrostane and 17-ketoetiocholane compounds, as well as 20-hydroxypregnanes.

The process of degradation of the 17-side chain of steroid compounds to give 17-ketosteroids, especially 17-ketoandrostanes and 17-ketoetiocholanes by chemical means is well known, but these procedures usually involve a number of steps such as formation of a 17(20) double bond and oxidation of this double bond. In such oxidative degradation the steroid nucleus is often attacked in other positions, especially double bonds with resulting high losses. In order to avoid such losses, protection of such positions or groups which involve at least two additional steps is practiced in the art. For example, Bergmann and Stevens, J. Org. Chem. 13, 10 (1948) show the ozonolysis of 22-enol acetate of $3\beta$-acetoxybisnor-5,7-choladien-22-al protected by a 5,8 maleic anhydride adduct group to yield the maleic anhydride adduct of $3\beta$-acetoxy-5,7-androstadiene-17-one.

The process of the present invention comprises subjecting a 20-ketopregnane or 20-ketoallopregnane compound to the action of fungus of the genus Penicillium to produce a 17-ketoandrostane or 17-ketoetiocholane compound.

It is an object of the present invention to provide a direct method for the degradation of a 17-side chain of 20-ketopregnane and 20-ketoallopregnane compounds by the action of a fungus of the genus Penicillium. Another object of the present invention is the provision of a process for the production of 17-ketoandrostane and 17-ketoetiocholane compounds which are useful in therapy or as intermediates for the synthesis of therapeutically useful products from 20-ketopregnanes and 20-ketoallopregnanes. Other objects and uses of this invention will be apparent to those skilled in the art to which this invention pertains.

The method of the present invention is able to furnish a variety of useful products. For example, progesterone when subjected to the action of *Penicillium lilacinum* gives 4-androstene - 3,17 - dione possessing known androgenic properties. 4-androstene-3,17-dione can be converted to 17-ethynyl testosterone (Stavely, U. S. Patent 2,288,854, issued October 11, 1941) and the latter by hydrogenation to dihydrotestosterone of therapeutic use (Symposium on Steroids in Experimental and Clinical Practice, The Blakiston Company, New York, 1951, p. 375). Similarly, fermentation of 11-ketoprogesterone provides the known 4-androstene-3,11,17-trione (andrenosterone), which is a useful starting material for $11\beta$-hydroxytestosterone.

The starting steroid compounds of the present application are 20-ketosteroids, and preferably 20-ketopregnanes and 20-ketoallopregnanes. The cyclopentanepolyhydrophenanthrene radical with a $17\beta$-side chain may also possess keto groups or hydroxy groups in other positons, especially positions 3, 6, 7, 8, 11, 12, 14, 17, and 21, and may have double bonds in various positions especially in positions 4 and 5. Representative starting materials include: $3\alpha$- and $3\beta$-hydroxypregnane-20-one, $3\alpha$- and $3\beta$-hydroxy-5-pregnene-20-one, $3\alpha$- and $3\beta$-hydroxypregnane-11,20-dione, $3\alpha,11\alpha$-, $3\alpha,11\beta$-, $3\beta,11\alpha$- and $3\beta,11\beta$-dihydroxypregnane-20-one, progesterone, $17\alpha$-hydroxyprogesterone, 11 - ketoprogesterone, $11\alpha$ - hydroxyprogesterone, $11\alpha,17\alpha$-dihydroxyprogesterone, 11-keto-$17\alpha$-hydroxyprogesterone, $11\alpha$-acetoxyprogesterone, $11\beta$-hydroxyprogesterone, $14\alpha$-hydroxyprogesterone, $14\alpha,17\alpha,21$-trihydroxy-4-pregnene-3,20-dione, $14\alpha$-hydroxy-11-desoxycorticosterone; $17\alpha,21$-dihydroxy-4-pregnene-3,20-dione (Reichstein's Compound "S"), corticosterone, cortisone, cortisone acetate, dihydrocortisone (Kendall's Compound "F") and $11\alpha,17\alpha,21$-trihydroxy-4-pregnene-3,20-dione (11-epi "F") pregnane - 3,11,20-trione, $17\alpha$-hydroxypregnane - 3,11,20-trione, pregnane - 3,12,20 - trione, $17\alpha$-hydroxypregnane-3,20-dione, allopregnane - 3,11,20 - trione, allopregnane-3,20-dione, $3\alpha$-hydroxy - 5 - pregnene - 20-one, $3\alpha$- and $3\beta$ - hydroxyallopregnane-20-one, $3\alpha,12\alpha,21$ - trihydroxypregnane-20-one, $3\alpha,17\alpha$-dihydroxypregnane-20-one, $6\alpha$- and $6\beta$-hydroxyprogesterone, pregnane-3,6,20-trione, and the like.

In carrying out the process of the present invention the selected 20-ketosteroid, suitably in a solvent, for example, acetone is subjected to a growth of a species of fungus of the genus Pinicillium. The classification and definition of Penicillium as herein employed is that of Raper, K. B., and Thom, C., "A Manual of the Penicillia," Williams and Wilkins Company, Baltimore, 1949. Among species of the genus Penicillium useful in the fermentation of steroids may be mentioned those of the sub-genus: Monoverticillata, Asymmetrica - divaricata, Asymmetrica - velutina, Asymmetrica - lanata, Asymmetrica - funiculosa, Asymmetrica-fasciculata, Biverticillata-symmetrica, and Polyverticillata, for example: *Penicillium adametzi, brevicompactum, camemberti, canescens, capsulatum, charlesii, citrinum, claviforme, commune, cyclopium, decumbens, digitatum, duclauxi, expansum, frequentans, funiculosum, fascum, gladioli, granulatum, herquei, implicatum, italicum, janthinellum, lavendulum, levitum, lilacinum, luteum, nigricans, notatum, novae-zeelandiae, ochraceum, oxalicum, palladum, purpurogenum, purpurogenum var. rubrisclerotium, raistrickii, roqueforti, roseo-purpureum, rugulosum, terrestre, thomii, urticae,* and *viridicatum.*

Culture of the fungi, for the purpose and practice of the present invention, is in or on a medium favorable to the development of the fungi. Solid media may be utilized, but the preferred media are those which permit quantity growth under aerobic conditons. Moist solid particulate media, such as bran, cereal grains, cereal grits, wood chips, shavings, sawdust, cornhusks, fibrous material, such as copra, chestnuts, or lupine seeds may be used. These can be extracted with alcohol, ether or other organic solvents, to remove objectionable contaminants and growth inhibtors prior to fermentation. The carriers may optionally contain added growth factors and nutrients and may be used in layers or trays with or without auxiliary aeration, in towers as in the vinegar process or under conditions of agitation as for example by tumbling in a rotating drum. Liquid media, illustratively brewer's wort, are well adapted to use under aerobic layer or more especially aerobic submerged fermentation conditions. Suitably the media should contain sources of available carbon, nitrogen and minerals although of course there can be significant growth and development under less than optimum conditions.

Available carbon may be from carbohydrates, starches, gelatinized starches, dextrin, sugars, molasses as of cane, beet and sorghum, glucose, fructose, mannose, galactose, maltose, sucrose, lactose, pentoses, amino acids, peptones or proteins. Carbon dioxide, glycerol, alcohols, acetic acids, sodium acetate, citric acid, sodium citrate, lower fatty acids, higher fatty acids, or fats are illustrative of other materials which provide assimilable carbon for the energy requirements of the fungi. Mixtures of various carbon sources are sometimes advantageous.

Nitrogen in assimilable form may be provided by soluble or insoluble vegetable or animal proteins, soybean meal, lactalbumin, casein, egg albumin, peptones, polypeptides or amino acids, urea, ammonium salts, ammonia trapped on base exchange resins or on zeolites, ammonium chloride, sodium nitrate, potassium nitrate, morpholine. Whey, distillers solubles, corn steep liquor, or yeast extract have been useful.

As mineral constituents the media or menstruum may contain, naturally present or added, available aluminum, calcium, chromium, cobalt, copper, gallium, iron, magnesium, molybdenum, potassium, scandium, uranium and vanadium. Sulfur may be provided by sulfates, alkyl sulfonates, sulfoxylates, sulfamates, sulfinates, free sulfur, hyposulphite, persulfate, thiosulfate, methionine, cystine, cystein, thiamin or biotin. Phosphorus, preferably pentavalent, suitably in a concentration at or about 0.001 to 0.07 molar and particularly at or about 0.015 to 0.02, may be present, suitably as ortho-, meta-, or pyrophosphates, salts or esters, phytin, phytic acid, phytates, glycerophosphate, sodium nucleinate, and/or corn steep liquor, casein or ovovitellin. Boron, iodine and selenium in traces may be advantageous. Desirably boron, in the form of boric acid or sodium borate may be present or added especially after germination and early growth of the fungus.

Other accessory growth factors, vitamins, auxins and growth stimulants may be provided as needed or desired.

While solid or liquid media may be utilized, liquid media is preferred as it favors mycelial growth.

Suspending agents or mycelial carriers such as filter earths, filter aids, finely divided cellulose, wood chips, bentonite, calcium carbonate, magnesium carbonate, charcoal, activated carbon or other suspendable solid matter, methyl cellulose, carboxymethyl cellulose or alginates may be added to facilitate fermentation, aeration and filtration.

The selected species of fungus is grown on a medium containing available carbon, illustratively carbohydrates, such as sugar or starches; assimilable nitrogen, illustratively soluble or insoluble proteins, peptones or amino acids; and mineral constituents, illustratively phosphates and magnesium sulfate; and other art recognized, desirable or adventitious, additions. The medium may desirably have a pH before inoculation of between about 4 to 8 although a higher or lower pH may be used. A pH of between about 4 and about 6 is preferred for the growth of Penicillium.

Inoculation of the fungal growth-supporting medium with the selected fungus of the genus Penicillium may be accomplished in any suitable manner. Penicillium grows over a range from about 20 to about 38 degrees centigrade, with a temperature between about 25 to about 32 degrees preferred.

The developmental period of fungal growth required before the steroid to be fermented is exposed to the fungus does not appear to be critical. For example, the steroid may be added either before thermal or other sterilization of the medium, at the time of inoculating the medium with the selected Penicillium species, or at some time, for example, 24 or 48 hours, later. The steroid to be fermented may be added at any suitable concentration although for practical reasons steroid substrate at a concentration of about or up to about 0.6 gram per liter or even 0.8 gram per liter of medium is satisfactory and two grams per liter is operative although higher concentration depending on the particular steroid, may be used with some inhibition of mycelial development. The addition of steroid substrate to be fermented may be accomplished in any suitable manner especially so as to promote a large surface of contact of the steroid substrate with the oxygenating activity of the fungus, such as by dispersing the steroid substrate, either alone, with a dispersing agent, or in solution in an organic solvent by mixing or homogenizing a steroid substrate with a fungal medium to form a suspension or dispersion of steroid. Either submerged or surface culture procedures may be used with facility, although submerged culture is preferred. Alternatively, steroid fermenting enzymes of a growth of the fungus may be separated from the fungus or medium admixed with the steroid or a solution or dispersion thereof, and the mixture subjected to aerobic conditions to accomplish fermentation of the steroid.

The temperature during the period of fermentation of the steroid may be the same as that found suitable for fungal growth. It need be maintained only within such range as supports life, active growth, or the enzyme activity of the fungus.

While any form of aerobic incubation is satisfactory for the growth of the selected fungus or fermentation of the steroid substrate, the efficiency of steroid fermentation is related to aeration. Therefore, aeration is usually controlled, as by agitation and/or blowing air through the fermentation medium. Aeration may be effected by surface culture or under submerged fermentation conditions. Aerobic conditions include not only the use of air to introduce oxygen, but also other sources or mixtures containing oxygen in free or liberatable form. In using air as the aerating medium, a desirable rate of aeration is about four to twenty millimoles of oxygen per hour per liter as determined by the method of Cooper, Fernstrom and Miller, Ind. Eng. Chem. 36, 504 (1944). Aeration is suitably modified by using superatmospheric or subatmospheric pressures, for example, thirty pounds per square inch or ten pounds per square inch absolute. Oxygen uptake may be facilitated by the presence of various agents such as ascorbic acid, glutamic acid, citric acid, lactic acid, tyrosine, or tryptophane.

The time required for the fermentation of steroid varies somewhat with the procedure. When the steroid substrate is present at the time of inoculation of the medium, periods of from 8 to 72 hours may be used. However, when the steroid is added to the fungus, after substantial aerobic growth of the fungal organism, for example, after 16 to 24 hours at optimum temperature, the conversion of steroid substrate begins immediately and high yields are obtained in from 1 to 72 hours, 24 hours being generally satisfactory.

After completion of the steroid fermentation, the resulting fermented steroid is recovered from the fermentation reaction mixture. An especially advantageous manner of recovering the fermented steroid involves extracting the fermentation reaction mixture, including the fermentation liquor and mycelia with a water-immiscible organic solvent for steroids, for example, methylene chloride, chloroform, carbon tetrachloride, ethylene chloride, trichloroethylene, ether, amyl acetate, benzene, and the like. The fermentation liquor and mycelia may be separated and then separately extracted with suitable solvents. The mycelia may be extracted with either water-miscible or water-immiscible solvents, acetone being effective. The fermentation liquor, freed of mycelia, may be extracted with water-immiscible solvents. The extracts can be combined, either before or after washing with an alkaline solution, illustratively sodium bicarbonate, suitably dried, as for example over anhydrous sodium sulfate, and the purified fermented steroid obtained by recrystallization from organic solvents or by chromatography to isolate the 17-keto steroid from the other fermentation products.

The following examples are illustrative of the process of the present invention and are not to be construed as limiting.

*Example 1.—Fermentation of progesterone and isolation of 4-androstene-3,17-dione and 20β-hydroxy-4-pregnene-3-one*

A medium was prepared of twenty grams of Edamine enzymatic digest of lactalbumin, three grams of corn steep liquor, and fifty grams of technical dextrose diluted to one liter with tap water and adjusted to a pH of 5.85. Twelve liters of this sterilized medium was inoculated with *Penicillium lilacinum* Thom, American Type Culture Collection Number 10,114, and incubated for 48 hours at a temperature of 26 degrees centigrade using a rate of aeration and stirring such that the oxygen uptake was 6.3 to 7 millimoles per hour per liter of $Na_2SO_3$ according to the method of Cooper, Fernstrom and Miller, Ind. Eng. Chem. 36, 504 (1944). To this medium containing a 48-hour growth of *Penicillium lilacinum* Thom was added six grams of progesterone in fifty milliliters of acetone to provide a suspension of the steroid in the culture. After an additional 24 hour period of incubation under the same conditions of temperature and aeration, the beer and mycelium were separated. The mycelium was filtered, washed twice, each time with a volume of acetone approximately equal to the volume of the mycelium, and extracted twice, each time with a volume of methylene chloride approximately equal to the volume of the mycelium. The acetone and methylene chloride extracts including solvent were added to the beer filtrate, the mixed extract and beer filtrate were extracted successively with two one-half by volume portions of methylene chloride and then with two one-fourth by volume portions of methylene chloride. The combined methylene chloride extracts were washed with two one-tenth by volume portions of a two percent aqueous solution of sodium bicarbonate and then with two one-tenth by volume portions of water. After drying the methylene chloride extracts with about three to five grams of anhydrous sodium sulfate per liter of solvent and filtering, the solvent was removed by distillation. The residue thus obtained weighed 5.88 grams and was redissolved and chromatographed over 300 grams of alumina. Fractions of 600 milliliters were collected as indicated in Table I.

TABLE I

| Fraction | Solvent | Eluate solids, Milligrams |
| --- | --- | --- |
| 1 | Benzene | 98.2 |
| 2 | do | 47.6 |
| 3 | Benzene-ether 19:1 | 18.8 |
| 4 | do | 132.8 |
| 5 | Benzene-ether 9:1 | 154.2 |
| 6 | do | 27.5 |
| 7 | Benzene-ether 1:1 | 302.7 |
| 8 | do | 1,267.0 |
| 9 | Ether | 1,160.6 |
| 10 | do | 402.2 |
| 11 | Ether-chloroform 19:1 | 97.9 |
| 12 | do | 69.4 |
| 13 | Ether-chloroform 9:1 | 180.7 |
| 14 | do | 356.1 |
| 15 | Ether-chloroform 1:1 | 101.1 |
| 16 | do | 95.3 |
| 17 | do | 32.6 |
| 18 | do | 12.9 |
| 19–22 | Chloroform | 34.9 |
| 23 | Chloroform-acetone 19:1 | 5.8 |
| 24 | Acetone | 24.6 |
| 25 | Methanol | 210.3 |
| 26 | do | 7.2 |

Fractions 9 through 11 were combined and evoparated to yield 1.66 grams of solids which were washed with two five-milliliter portions of Skellysolve B (hexanes). The remaining crystals, 1.58 grams of melting point 172 to 175 degrees centigrade, were dissolved in ten milliliters of hot acetone, the thus-obtained solution was filtered and concentrated to a volume of five milliliters. After refrigeration overnight, 1.2 grams of crystals of melting point 175 to 177 degrees centigrade were obtained. These crystals were recrystallized from four to five milliliters of acetone and 3.5 milliliters of Skellysolve B (hexanes) to give 899 milligrams of crystalline 4-androstene-3,17-dione, of melting point 175 to 176.5 degrees centigrade and $[\alpha]_D^{23}+194$ (C, 0.981 in chloroform).

*Analysis.*—Percent calculated for $C_{19}H_{26}O_3$: C, 79.69; H, 9.15. Found: C, 79.53; H, 8.94.

Fractions 13 and 14, containing 537 milligrams of solids, were combined, dissolved in fifty milliliters of benzene and rechromatographed over 25 grams of alumina. Fractions of fifty milliliters were collected as indicated in Table II.

TABLE II

| Fraction | Solvent | Eluate solids, Milligrams |
| --- | --- | --- |
| 1 | Benzene-ether 1:1 | 7.0 |
| 2 | do | 5.2 |
| 3 | Ether | 2.1 |
| 4 | do | 24.8 |
| 5 | Ether-chloroform 19:1 | 48.1 |
| 6 | do | 80.3 |
| 7 | Ether-chloroform 9:1 | 87.6 Combined. |
| 8 | do | 70.4 |
| 9 | Ether-chloroform 1:1 | 51.0 |
| 10 | do | 37.5 |
| 11 | do | 19.7 |
| 12 | Chloroform | 9.1 |
| 13 | do | 24.8 |
| 14 | do | 5.0 |
| 15 | Chloroform-acetone 19:1 | 4.8 |
| 16 | Acetone | 4.0 |
| 17–18 | Methanol | 13.3 |

Fractions 4 through 11 were combined and twice recrystallized from three milliliters of methylene chloride and one milliliter of Skellysolve B (hexanes) to yield 114 milligrams of crystals having a melting point of 151 to 152 degrees centigrade identified as 20α-hydroxy-4-pregnene-3-one by infrared and micro-analysis.

*Example 2.—Fermentation of 11-desoxycorticosterone acetate*

A medium was prepared from 0.5 percent peptone, two percent dextrose, 0.5 percent soybean meal, 0.5 percent monobasic potassium phosphate, 0.5 percent sodium chloride and 0.3 percent yeast extract diluted with tap water to one liter and adjusted to a pH of 5.9 after sterilization. Three liters of this sterilized medium was inoculated with *Penicillium canescens*, ATCC Number 10,419, and incubated for 24 hours at a temperature of 28 degrees centigrade using a rate of aeration of seven millimoles per hour per liter of $Na_2SO_3$ according to the method of Cooper, Fernstrom and Miller, Ind. Eng. Chem. 36, 504 (1944). To this medium containing a 24 hour growth of *Penicillium canescens* was added one gram of 11-desoxycorticosterone acetate in twenty milliliters of absolute ethanol to provide a suspension of the steroid in the culture. After an additional 24-hour period of incubation under the same conditions of temperature and aeration, the beer and mycelium were extracted and chromatographed as shown in Example 1 to yield 4-androstene-3,17-dione and 20α,21-dihydroxy-4-pregnene-3-one.

*Example 3.—Fermentation of 14α-hydroxyprogesterone*

A medium was prepared of twenty grams of cornsteep liquor, twenty grams of dextrose, one gram of monobasic potassium phosphate, two grams of sodium nitrate, 0.5 gram of magnesium sulfate, 0.2 gram of potassium chloride, 0.01 gram of ferrous sulfate, two grams of sodium acetate diluted to one liter with tap water. Two liters of this medium was introduced after sterilization in 100-milliliter portions in twenty shake flasks and inoculated with *Penicillium lilacinum*. To a 24-hour growth of the mold in this medium at 26 degrees centigrade was added in each bottle a ten-milligram portion of 14α-hydroxyprogesterone prepared as disclosed by Murray and Peterson, application Serial Number 306,924, filed August 28, 1952, now Patent 2,670,358 issued February 23, 1954. After a 48-hour incubation period, shaking with ambient air, at 26 degrees centigrade, the contents of the flasks were combined, extracted with methylene dichloride, and the extracts were evaporated to give 785 milligrams of solid residue. This residue was dissolved in 35 milliliters of benzene and chromatographed over forty grams of alumina. Fraction 24 (chloroform) weighed 103.0 milligrams and contained 22 percent of 14α-hydroxy-4-androstene-3,17-dione. Fraction 25 (acetone) weighed 116.5 milligrams and contained sixteen percent of 14α-hydroxy-4-androstene-3,17-dione. This latter fraction was dissolved in one milliliter of ethyl-acetate and allowed to evaporate at room temperature. This procedure when repeated several times induced crystallization. The fraction was then triturated with two milliliters of ether and a few drops of acetone to give ten milligrams of 14α-hydroxy-4-androstene-3,17-dione of melting point 252 to 258 degrees centigrade.

In the same manner as given in Example 3, fermentation of 14α-hydroxy-11-desoxycorticosterone or 14α,17α,-21-trihydroxy-4-pregnene-3,20-dione with *Penicillium lilacinum* produces 14α-hydroxy-4-androstene-3,17-dione (gonadal activity).

*Example 4.*—Fermentation of 11 - desoxycorticosterone acetate with Penicillium nigricans In the same manner as given in Example 1, using *Penicillium nigricans*, American Type Culture Collection No. 10,115, and 11-desoxycorticosterone as a starting steroid produced 4-androstene-3-17-dione and 20α,21-dihydroxy-4-pregnene-3-one.

*Example 5.*—Fermentation of 11 - desoxycorticosterone acetate with Penicillium charlesii In the same manner as given in Example 1, using *Penicillium charlesii*, American Type Culture Collection Number 8,730, and 11-desoxycorticosterone acetate produced 4-androstene-3,17-dione and 20α,21-dihydroxy-4-pregnene-3-one. Similarly, the 21-acyloxy esters of 11-desoxycorticosterone, for example, the propionate, butyrate, isobutyrate, valerate, hexanoate, benzoate, phenylacetate and other esters of 11-desoxycorticosterone yield 4-androstene-3,17-dione and the corresponding 20α,21-dihydroxy-4-pregnene-3-one upon treatment with a fungus of the genus Penicillium.

*Example 6.*—Fermentation of progesterone with Penicillium brevi compactum

In the same manner as given in Example 2, using *Penicillium brevi compactum*, ATCC Number 9,056 and progesterone produced 4-androstene-3,17-dione and 20α, 21-dihydroxy-4-pregnene-3-one.

*Example 7.*—Fermentation of 11 - desoxycorticosterone acetate with Penicillium lividum In the same manner as given in Example 1, using *Penicillium lividum*, ATCC Number 10,102 and 11-desoxycorticosterone acetate produced 4-androstene-3-17-dione and 20α,21-dihydroxy-4-pregnene-3-one. Similarly, other 21-esters of 11-desoxycorticosterone such as the propionate, butyrate, isobutyrate, valerate, hexanoate, benzoate, phenylacetate and other like esters of 11-desoxycorticosterone yield 4-androstene-3,17-dione and the corresponding 20α-hydroxy-21-acyloxy-4-pregnene-3-one upon treatment with a fungus of the order Penicillium.

*Example 8.*—Fermentation of 11 - ketoprogesterone with Penicillium expansum

In the same manner as given in Example 1, using *Penicilium expansum*, ATCC Number 7,861, and 11-ketoprogesterone produced 4-androstene-3,11,17-trione (adrenosterone) was obtained.

*Example 9.*—Fermentation of progesterone

In the same manner as given in Example 2, using *Penicillium frequentans*, ATCC Number 10,444, and progesterone produced 4-androstene-3,17-dione.

*Example 10.*—Fermentation of 17α-hydroxyprogesterone

In the same manner as given in Example 1, using *Penicillium lilacinum*, ATCC Number 10,114, and 17α-hydroxyprogesterone produced 4-androstene-3,17-dione.

*Example 11.*—Fermentation of 11α,17α-dihydroxyprogesterone

In the same manner as given in Example 2, using *Penicillium thomii*, ATCC Number 10,506, and 11α,17α-dihydroxyprogesterone produced 11α-hydroxy-4-androstene-3,17-dione.

*Example 12.*—Fermentation of pregnane-3,6,20-trione

In the same manner as given in Example 2, using *Penicillium novae zeelandiae*, ATCC Number 10,473, and pregnane-3,6,20-trione produced etiocholane-3,6,17-trione. Etiocholane-3,6,17-trione gives 4-bromoetiocholane-3,6,17-trione (by bromination) which by dehydrobromination gives 4-androstene-3,6,17-trione of estrogenic activity [Butenandt, Ber. 69, 1163, (1936)].

*Example 13.*—Fermentation of 6β-hydroxyprogesterone

In the same manner as given in Example 1, using *Penicillium citrinum*, ATC Number 10,105, and 6β-hydroxyprogesterone produced 6β - hydroxy - 4-androstene-3,17-dione.

*Example 14.*—Fermentation of pregnane-3,20-dione

In the same manner as given in Example 2, using *Penicillium canescens*, ATC Number 10,419, and pregnane-3,20-dione produced etiocholane-3,17-dione, which by sodium borohydride reduction yields both 3α- and 3β-hydroxyetiocholane which possesses anesthetic activity.

*Example 15.*—Fermentation of allopregnane-3,11,20-trione

In the same manner as given in Example 1, using *Penicillium lilacinum* Thom, and allopregnane-3,11,20-trione produced androstane-3,11,17-trione (male hormone activity).

*Example 16.*—Fermentation of Reichstein's Compound S (17α,21-dihydroxy-4-pregnene-3,20-dione)

In the same manner as given in Example 1, using *Penicillium lilacinum*, ATCC Number 10,114, and Reichstein's Compound S (17α,21-dihydroxy-4-pregnene-3,20-dione) produced 4-androstene-3,17-dione and 17α,20α,21-trihydroxy-4-pregnene-3-one.

*Example 17.*—Fermentation of cortisone

In the same manner as given in Example 1, using *Penicillium lilacinum*, ATCC Number 10,114, and cortisone produced 4-androstene-3,11,17-trione (adrenosterone).

*Example 18.*—Fermentation of cortisone acetate

In the same manner as given in Example 1, using *Penicillium lilacinum*, ATCC Number 10,114 and cortisone acetate produced 4-androstene-3,11,17-trione.

*Example 19.*—Fermentation of 11α,17α,21-trihydroxy-4-pregnene-3,20-dione

In the same manner as given in Example 1, using *Penicillium lilacinum*, ATCC Number 10,114 and 11α,17α,21-trihydroxy-4-pregnene-3,20-dione produced 11α-hydroxy-4-androstene-3,17-dione.

*Example 20.*—Fermentation of 3α,11α,17α-trihydroxy-pregnane-20-one

In the same manner as given in Example 1, using *Penicillium lilacinum*, ATCC Number 10,114, and 3α,-

11α,17α-trihydroxypregnane-20-one produced 3α,11α-dihydroxyetiocholane-17-one.

*Example 21.—Fermentation of pregnane-3,12,20-trione*

In the same manner as given in Example 1, using *Penicillium lilacinum*, ATCC Number 10,114 and pregnane-3,12,20-trione produced etiocholane-3,12,17-trione.

It is to be understood that the invention is not to be limited to the exact details of the procedure shown and described as obvious modifications and equivalents will be apparent to one skilled in the art, and the invention is therefore to be limited only by the scope of the appended claims.

We claim:

1. A process for the production of a 17-ketosteroid, which comprises: growing a fungus of the genus Penicillium under aerobic conditions, in the presence of a nutrient medium and a 20-ketosteroid selected from the group consisting of 20-ketopregnane and 20-ketoallopregnane compounds and isolating and recrystallizing the resulting 17-ketosteroid.

2. A process for the production of a 17-ketosteroid, which comprises: growing a fungus of the genus Penicillium under aerobic conditions, in the presence of a nutrient medium containing assimilable non-steroidal carbon and a 20-ketosteroid selected from the group consisting of a 20-ketopregnane and a 20-ketoallopregnane and isolating and recrystallizing therefrom a resulting 17-ketosteroid.

3. A process for the production of a 17-ketosteroid which comprises: growing a fungus of the genus Penicillium under aerobic, submerged conditions in the presence of a nutrient medium containing assimilable non-steroidal carbon, nitrogen and phosphorus and a 20-ketosteroid selected from the group consisting of a 20-ketopregnane and a 20-ketoallopregnane and isolating and recrystallizing therefrom a resulting 17-ketosteroid.

4. A process for the production of a 17-ketosteroid which comprises: growing a fungus of the genus Penicillium under aerobic conditions with agitation, in the presence of a nutrient medium containing assimilable carbohydrate, nitrogen and phosphorus and a 20-ketosteroid selected from the group consisting of a 20-ketopregnane and a 20-ketoallopregnane and isolating and recrystallizing a resulting 17-ketosteroid.

5. A process for the production of a 17-ketosteroid which comprises: growing a fungus of the genus Penicillium under aerobic, submerged conditions with agitation in the presence of a nutrient medium containing assimilable carbohydrate, nitrogen and phosphorus and a 20-ketosteroid selected from the group consisting of a 20-ketopregnane and a 20-ketoallopregnane and isolating and recrystallizing a resulting 17-ketosteroid.

6. A process for the production of a 17-ketosteroid which comprises: growing a fungus of the genus Penicillium under aerobic conditions with agitation, in the presence of a nutrient medium containing assimilable non-steroidal carbon, nitrogen and phosphorus and a 20-ketosteroid selected from the group consisting of a 20-ketopregnane and a 20-ketoallopregnane and isolating and recrystallizing a resulting 17-ketosteroid.

7. A process for the production of a 17-keto-4-androstene which comprises: growing a fungus of the genus Penicillium under aerobic conditions in the presence of a nutrient medium containing assimilable non-steroidal carbon and a Δ$^4$-20-ketopregnane and isolating and recrystallizing a resulting 17-keto-4-androstene.

8. A process for the production of a 4-androstene-3,17-dione which comprises: growing a Penicillium under aerobic conditions in the presence of a nutrient medium containing assimilable non-steroidal carbon, nitrogen and phosphorus and a 3,20-diketo-Δ$^4$-pregnene compound and isolating and recrystallizing a thus-produced 4-androstene-3,17-dione.

9. A process for the production of a 4-androstene-3,17-dione which comprises: growing a fungus of the species *Penicillium lilacinum* under aerobic conditions with agitation in the presence of a nutrient medium containing assimilable carbohydrate, nitrogen and phosphorus and a 3,20-diketo-Δ$^4$-pregnene compound and isolating and recrystallizing a thus-produced 4-androstene-3,17-dione.

10. A process for the production of 4-androstene-3,17-dione which comprises: growing a fungus of the species *Penicillium lilacinum* under aerobic conditions with agitation in the presence of a nutrient medium containing assimilable carbohydrates, nitrogen and phosphorus and a 20-ketosteroid selected from the group consisting of progesterone, 11-desoxycorticosterone and 21-carboxylic acid esters of 11-desoxycorticosterone and isolating and recrystallizing a thus-produced 4-androstene-3,17-dione.

11. A process for the production of 14α-hydroxy-4-androstene-3,17-dione which comprises: growing a fungus of the genus Penicillium under aerobic conditions in the presence of a nutrient medium containing assimilable non-steroidal carbon, nitrogen and phosphorus and a 14α-hydroxy-3,20-diketo-Δ$^4$-pregnene compound, and isolating and recrystallizing a thus-produced 14α-hydroxy-4-androstene-3,17-dione.

12. A process for the production of a 14α-hydroxy-4-androstene-3,17-dione which comprises: growing a fungus of the species *Penicillium lilacinum* under aerobic conditions and with agitation in the presence of a nutrient medium containing assimilable carbohydrates, nitrogen and phosphorus and a 14α-hydroxy-3,20-diketo-Δ$^4$-pregnene compound and isolating and recrystallizing a thus-produced 14α-hydroxy-4-androstene-3,17-dione.

13. The process of claim 12 wherein the 14α-hydroxy-3,20-diketo-Δ$^4$-pregnene is 14α-hydroxyprogesterone.

14. A process for the production of a 17-ketoandrostane which comprises: growing a fungus of the genus Penicillium under aerobic conditions in the presence of a nutrient medium containing assimilable non-steroidal carbon, nitrogen and phosphorus and a 20-ketoallopregnane and isolating and recrystallizing a thus-produced 17-ketoandrostane.

15. A process for the production of an androstane-3,11,17-trione which comprises: growing a fungus of the genus Penicillium under aerobic conditions with agitation in the presence of a nutrient medium containing assimilable carbohydrate, nitrogen and phosphorus and an allopregnane-3,11,20-trione and isolating and recrystallizing a thus-produced androstane-3,11,17-trione.

16. A process for the production of androstane-3,11,17-trione which comprises: growing a fungus of the species *Penicillium lilacinum* under aerobic conditions with agitation, in the presence of a nutrient medium containing assimilable carbohydrate, nitrogen and phosphorus and an allopregnane-3,11,17-trione and isolating and recrystallizing a thus-produced androstane-3,11,17-trione.

17. A process for the production of a 17-etiocholane which comprises: growing a fungus of the genus Penicillium under aerobic conditions in the presence of a nutrient medium containing assimilable non-steroidal carbon, nitrogen and phosphorus and a 20-ketopregnane and isolating and recrystallizing a thus-produced 17-etiocholane.

18. A process for the production of etiocholane-3,17-dione which comprises: growing a fungus of the order *Penicillium canescens* under aerobic conditions with agitation in the presence of a nutrient medium containing assimilable carbohydrate, nitrogen and phosphorus and pregnane-3,20-dione and isolating and recrystallizing a thus-produced etiocholane-3,17-dione.

19. A process for the production of etiocholane-3,6,17-trione which comprises: growing a fungus of the species Penicillium under aerobic conditions in the presence of a nutrient medium containing assimilable non-steroidal carbon, and pregnane-3,6,17-trione and isolating and recrystallizing a thus-produced etiocholane-3,6,17-trione.

20. A process for the production of etiocholane-3,6,17-trione which comprises: growing a fungus of the species *Penicillium novae zeelandiae* under aerobic conditions with agitation in the presence of a nutrient medium containing assimilable carbohydrate, nitrogen and phosphorus and pregnane-3,6,17-trione, and isolating and recrystallizing a thus-produced etiocholane-3,6,17-trione.

References Cited in the file of this patent

UNITED STATES PATENTS

| | | |
|---|---|---|
| 2,649,400 | Murray et al. | Aug. 18, 1953 |
| 2,649,401 | Haines et al. | Aug. 18, 1953 |